Dec. 22, 1931.  W. R. LODER  1,837,559
AUTOMATIC SIGNAL WHISTLE VALVE
Filed Nov. 26, 1929
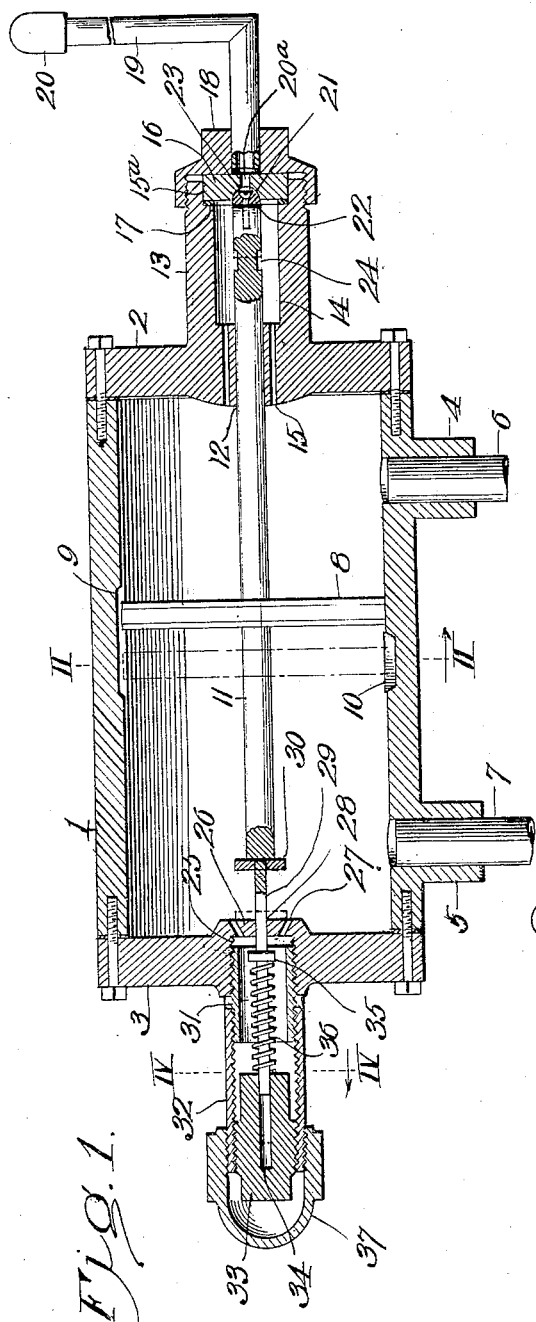
Inventor
W. R. Loder
By
Thorpe & Thorpe
Attorneys Patented Dec. 22, 1931

1,837,559

UNITED STATES PATENT OFFICE

WINFIELD R. LODER, OF HUTCHINSON, KANSAS

AUTOMATIC SIGNAL WHISTLE VALVE

Application filed November 26, 1929. Serial No. 409,799.

This invention relates to signal whistles and more especially to automatic valve construction therefor, and the general object is to produce a valve construction which automatically compensates for or replenishes the air lost by ordinary leakage from the signal line and thus guards against accidental production of a blast or blasts by the whistle, and which, upon a sudden opening of the signal line, and consequent quick reduction of pressure at one side of a piston within a cylinder, permits air from the reservoir line to apply preponderating pressure on and move the piston and thereby effect unseating of the valve to permit the whistle to blast its signal.

More specifically the object is to provide a cylinder having a piston and a continuously open air supply port, by-passing the piston to normally maintain balanced pressure on the latter, and yielding means for normally holding the piston at one side of a recharge port with the latter at such time functionless and the valve closed, the yielding means, upon a sudden lowering of the pressure at the recharge-port side of the piston, being overcome by the pressure at the opposite side of the piston to permit the later to move and unseat the valve and assume a position where it bridges the recharge port, in order that the latter may cooperate with the supply port in quickly rebalancing the pressure on both sides of the piston, the yielding means reversing the movement of the piston to reseat the valve as or slightly before the pressure becomes equal or rebalanced on both sides of the piston.

A still further object is to provide a valve construction dependably operative regardless of weather or temperature conditions, and which is of simple, strong and durable construction and susceptible of quick repair or adjustment to accommodate a particular air pressure.

With these objects in view, the invention consists in certain novel and useful features of construction and combinations of parts as hereinafter described and claimed; and in order that it may be fully understood, reference is to be had to the accompanying drawings, in which:

Figure 1 is a central vertical longitudinal section of an automatic whistle embodying the invention.

Figure 2 is a cross section on the line II—II of Figure 1.

Figure 3 is a detail fragmentary perspective view of a part of the piston stem, and also shows the valve construction in disconnected relation.

Figure 4 is a cross section on the line IV—IV of Figure 1.

In the said drawings, 1 indicates a casing preferably of cylindrical form as shown and closed at its front and rear ends by removable heads 2 and 3. Near its opposite ends the casing is provided with tubular bosses 4 and 5 tapped or threaded internally for engagement by pipes 6 and 7 respectively, the former leading from the main compressed air reservoir, not shown, and then through the reducing valve, also not shown, as conventional construction. The pipe 7 leads to the signal line of the train so that when the conductor pulls the signal cord, not shown, of any coach or car, the air pressure in the end of the cylinder with which pipe 7 connects, is reduced, for a purpose which hereinafter appears.

Fitting in and forming a movable partition for the casing, is a ring-packed or equivalent piston 8 which, when the whistle is not in operation, stands in the position shown by full lines, Figure 1, and thus cuts off communication between the chambers at opposite sides of the partition or piston except through a small recess 9 formed in the inner wall of the casing and constituting a supply port which is always open between the chambers at opposite sides of said partition or piston. In the vertical plane of the rear end of said supply port 9, is a deeper or recharging port 10 in the inner wall of the casing. Said port, when the whistle is not in operation, is functionless, but when air is quickly exhausted and its pressure is sufficiently reduced at the rear side of the partition or piston the latter is forced by the preponderating pressure on its opposite or front side, to the position shown in dotted lines, Figure 1. Air can then pass from the right hand or front side of the piston through the port 10 as well as through the supply port 9, to quickly recharge the chamber of the casing at the rear end of the partition, as will hereinafter be referred to more particularly.

The partition or piston is rigidly mounted on a central longitudinally extending stem 11, and the front portion of said stem extends through and finds a bearing or support in the head 2 at 12.

The said head is provided with a forwardly-projecting tubular extension or boss 13 providing a chamber 14 into which the front end of the stem projects, and said chamber communicates through the head 2 with the interior of the casing, by means of a suitable port or ports 15 so that the air forward of the piston, which is normally at 40 lbs. pressure, is at the same pressure in chamber 14. The front end of the chamber 14 is diametrically enlarged as at 15ª and fitting in said enlargement is a valve-seat member 16, a suitable gasket 17 being interposed between the valve-seat member and the forwardly-facing shoulder formed by the enlargement of said chamber 14, and said valve-seat member is clamped with an air-tight relation, upon the gasket by means of a union coupling 18 which is screwed upon the front end of the boss or extension 13. A pipe 19 is screwed into the coupling and equipped at its opposite end with a whistle 20 of conventional or any preferred type.

The valve-seat member has a central passage 20ª communicating with the whistle pipe 19, and said passage is enlarged to form a substantially conical seat 21 for engagement by a correspondingly formed valve 22 secured rigidly upon the front end of the stem 11 by means of a screw 23 or in any other suitable manner, and said valve is preferably made of fiber or equivalent material, though it is to be understood that any material may be employed which, when engaging the passage enlargement 21, will form a dependable closure for the passage 20. The valve stem is also preferably formed adjacent its front end, with an angular portion 24 for engagement by a suitable wrench or tool, not shown, to hold the stem against rotation when a screw driver is employed to withdraw the clamping screw 23 for the replacement of a worn valve 22 by a new one, it being understood of course that when such operation occurs the union nut and the valve-seat member are first removed so as to give access to the valve and the stem 11 from the front end of the boss 13.

The head 3 of the casing is provided with a central threaded opening 25 and the inner end of said opening is bridged by a spider 26 having a plurality of passages 27 establishing communication between the interior of the casing and the opening 25, and said spider is formed with a central bearing opening 28 accommodating the reduced extension 29 of the rear portion of the stem 11, the latter being preferably enlarged or provided with a collar 30 at its junction with the reduced extension to impinge upon the spider and thus positively limit travel of the piston or the partition 8 to the left or rearward, the piston when the collar is bearing against the spider, being disposed in the position shown by dotted lines, Figure 1, so that air may pass forward to the whistle and to the rear chamber of the casing through port or passage 10 as well as by way of the supply port 9.

A tube 31 is screwed into the opening 25 and provided with an externally threaded portion engaged by a tube 32 internally threaded at its rear end, and screwed into said internally threaded rear end is a nut 33 having a central socket or opening 34 of somewhat greater length than the reciprocatory travel of the piston or partition, and the reduced rear end of the stem 11 is seated in said socket, having play back and forth therein as the partition or piston reciprocates, it being noted that the piston stem finds support in head 2, nut 33 and in the spider and relieves the piston of undue wear at its lower edge. The reduced stem portion within the tube 31, is provided with an enlargement or collar 35, and a spiral spring 36 fitting around said stem, bears at its opposite ends against the nut 33 and said collar 35, the function of said spring being to slide the stem and hence the partition or piston forward until the valve is seated, whenever the pressure of air on both sides of the partition or piston is substantially equal. Normally this condition obtains because of the passage of air from the forward side of the piston through the supply port 9 to the rear side of the piston, and hence the pressure of the spring will hold the valve firmly upon its seat.

If it is desired to vary the tension of the spring 36, it can be accomplished by screwing the nut 33 in the proper direction into the pipe 32. Normally the nut 33 is inaccessible, as a cap 37 is screwed upon pipe 32, and must be removed by means of a wrench to give access to the nut. This cap is merely a protecting cap and has no other function. The casing may be rigidly secured of course at some convenient point in the cab of the locomotive, the particular place and manner of securing it being unimportant.

When a train is properly made up and the main reservoir properly charged, it will be understood, that, as stated, the air pressure at opposite sides of the partition or piston is balanced at about 40 lbs. or any other predetermined pressure, and that under such conditions, the spring 36 is holding the valve closed upon its seat. In the event a conductor or other person operates the pull cord of a coach and thus suddenly reduces the pressure in the signal line and hence in the casing behind the piston, the 40 lbs. pressure ahead of the piston instantly forces the piston rearward, this action overcoming the resistance of spring 36 and withdrawing the valve from its seat, and as a result operating the whistle. Immediately the pull cord is released the exhaust from the signal line ceases, and as the piston is opposite port 10 (see dotted lines), the air at the front side of the piston passes to the rear side thereof in sufficient capacity to almost instantly re-established or balance the pressures at the two sides of the piston, and as the pressure on the piston is thus balanced or almost balanced, the spring 36 acts to again advance the piston and seat the valve and cut off the air to the whistle.

From the above description, it will be apparent that I have produced a signal whistle which embodies the features of advantage set forth as desirable in the statement of the object of the invention, and which is susceptible of modification in minor particulars within the principle of construction and mode of operation involved and without departure from the spirit and scope of the appended claims.

I claim:

1. In train signalling apparatus, a casing, a movable partition dividing said casing into two chambers, a fluid supply pipe connected to one chamber and adapted to supply fluid under pressure, a fluid exhaust pipe connected to the other chamber, a by-pass whereby the pressures in said pipes are normally equal, yielding means applying force tending to move the partition in one direction, a signal device connected to the fluid receiving chamber, and a valve actuated by the yielding means to shut off the flow of fluid to the signal when the fluid pressure is substantially equal on both sides of the partition.

2. In train signalling apparatus, a casing, a movable partition dividing said casing into two chambers, a fluid supply pipe connected to one chamber and adapted to supply fluid under pressure, a fluid exhaust pipe connected to the other chamber, a by-pass whereby the pressures in said pipes are normally equal, yielding means applying force tending to move the partition in one direction, a signal device connected to the fluid receiving chamber, and a valve actuated by the yielding means to shut off the flow of fluid to the signal when the fluid pressure is substantially equal on both sides of the partition; said casing also having a recharging port establishing communication additional to that of the by-pass, between the said casing chambers when there is sufficient preponderating pressure on the partition at the receiving side thereof, to move the partition against the resistance of the said yielding means.

3. In train signalling apparatus, a cylindrical casing having closed ends, a piston stem axially mounted in said casing with its opposite ends slidingly engaged with the ends of the casing, a piston secured to said stem intermediate its length and dividing the casing into a supply and an exhaust chamber, a pipe for supplying air under pressure connected to the supply chamber, a signal pipe connected to said air exhaust chamber of the casing, a by-pass continuously connecting the supply and exhaust chambers around said piston, a guide receiving one end of the piston stem, and a spring applying pressure against said guide to return the piston and stem to normal position when the pressure in said chambers is equal, said guide being adjustably mounted to vary the tension of the piston-actuating spring.

4. In train signalling apparatus, a cylindrical casing having closed ends, a piston stem axially mounted in said casing with its opposite ends slidingly engaged with the ends of the casing, one end of said stem extending beyond the corresponding end of the casing and terminating in a valve, a valve seat for said valve, a piston secured on said stem intermediate its length and dividing the casing into a supply and an exhaust chamber, a signal pipe connected to said air exhaust chamber, a pipe for supplying air under pressure connected to the supply chamber, a by-pass continuously connecting the supply and exhaust chambers around said piston, and a spring for returning the piston and stem to normal position when the pressure in said chambers is equal.

5. A train signalling apparatus, a cylindrical casing having closed ends, a piston stem axially mounted in said casing with its opposite ends slidingly engaged with the ends of the casing, one end of said stem extending beyond the corresponding end of the casing, a tubular extension carried by the casing and receiving the projecting valve stem, adjustable spring tensioning means in said extension, a spring pressing at one end against said tensioning means and at its other end against the piston stem, a piston secured to said stem intermediate its length and dividing the casing into a supply and an exhaust chamber, a signal pipe connected to said exhaust chamber, a pipe for supplying air under pressure connected to the supply chamber, and a by-pass around said piston for continuously maintaining communication between said exhaust and supply chambers.

6. In train signalling apparatus, a cylindrical casing having closed ends, a piston stem axially mounted in said casing with its opposite ends slidingly engaged with the ends of the casing, a piston on said stem intermediate its length and dividing the casing into an air supply and an air exhaust port, the end of said stem adjacent the air supply port extending beyond the corresponding end of the casing and terminating in a valve, a valve seat for said valve, the opposite end of said stem extending beyond the corresponding end of the casing, a tubular extension carried by the casing and receiving said projecting valve stem, adjustable spring tensioning means in said extension, a spring pressing at one end against said tensioning means and at its other end against the piston stem, a pipe for supplying air under pressure connected to the supply chamber, a signal pipe connected to the exhaust chamber, and a by-pass around the piston for maintaining constant communication between said air supply and air exhaust chambers.

In testimony whereof I affix my signature.

WINFIELD R. LODER.